United States Patent
Chung et al.

(10) Patent No.: US 11,320,861 B2
(45) Date of Patent: May 3, 2022

(54) DOCKING STATIONS

(71) Applicant: HEWLETT-PACKARD DEVELOPMENT COMPANY, L.P., Houston, TX (US)

(72) Inventors: Ho-Sup Chung, Houston, TX (US); Stephen Ken Gustafson, Houston, TX (US); Lee E. Leppo, Houston, TX (US); Roger D. Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 899 days.

(21) Appl. No.: 16/076,466

(22) PCT Filed: Apr. 24, 2017

(86) PCT No.: PCT/US2017/029198
§ 371 (c)(1),
(2) Date: Aug. 8, 2018

(87) PCT Pub. No.: WO2018/199903
PCT Pub. Date: Nov. 1, 2018

(65) Prior Publication Data
US 2021/0181794 A1    Jun. 17, 2021

(51) Int. Cl.
*G06F 1/16* (2006.01)
*G06F 1/26* (2006.01)
*G06F 1/28* (2006.01)

(52) U.S. Cl.
CPC .......... *G06F 1/1632* (2013.01); *G06F 1/266* (2013.01); *G06F 1/28* (2013.01)

(58) Field of Classification Search
CPC .......... G06F 1/1632; G06F 1/26; G06F 1/266; G06F 1/28
See application file for complete search history.

(56) References Cited

U.S. PATENT DOCUMENTS

| | | |
|---|---|---|
| 5,818,691 A | 10/1998 | McMahan et al. |
| 6,888,338 B1 | 5/2005 | Popescu-Stanesti et al. |
| 8,237,414 B1 | 8/2012 | Li et al. |
| 8,732,348 B2 | 5/2014 | Sawyers et al. |
| 9,060,416 B2 | 6/2015 | Supran et al. |
| 10,437,761 B2 * | 10/2019 | Chen ..................... G06F 1/3253 |
| 2008/0075024 A1 | 3/2008 | Chuang et al. |
| 2013/0013936 A1* | 1/2013 | Lin ......................... G06F 1/266 713/300 |
| 2015/0338881 A1 | 11/2015 | Hsu et al. |

(Continued)

*Primary Examiner* — Zhipeng Wang
(74) *Attorney, Agent, or Firm* — Brooks, Cameron & Huebsch PLLC

(57) ABSTRACT

Example implementations relate to docking stations. A docking station can include a power sensing component to determine an amount of supplied power received from a power supply coupled to the docking station, a host power port to power a host device (HD), a peripheral power port (PPP) to power a peripheral device, and a controller to receive a signal indicative of a change in power demands of a HD or power demands of a PPP, redetermine an amount of host power in response to on the detected change, redetermine an amount of dock power in response to the detected change, and cause transmission of the redetermined host power to the HD and the redetermined dock power to the PPP.

13 Claims, 6 Drawing Sheets

(56) References Cited

U.S. PATENT DOCUMENTS

| | | | |
|---|---|---|---|
| 2016/0231777 A1 | 8/2016 | Decamp | |
| 2017/0364463 A1* | 12/2017 | Chen | G06F 13/4282 |
| 2018/0120910 A1* | 5/2018 | Farkas | G06F 1/266 |
| 2019/0115756 A1* | 4/2019 | Chong | H02J 9/06 |
| 2019/0123557 A1* | 4/2019 | Ming Pui | H02J 1/12 |
| 2019/0171268 A1* | 6/2019 | Ellis | G06F 1/266 |
| 2019/0278495 A1* | 9/2019 | Klein | G06F 1/3268 |

* cited by examiner

DOCKING STATIONS

BACKGROUND

Computing systems may include multiple input/output (I/O) systems. The systems can be a wired I/O such as Ethernet, Universal serial bus (USB), esata, IEEE 1394, thunderbolt, or another system. Such wired I/O systems can permit a physical connection to exchange power and/or data power between a peripheral device and a computing system such as a docking station.

DETAILED DESCRIPTION

Figure 1:
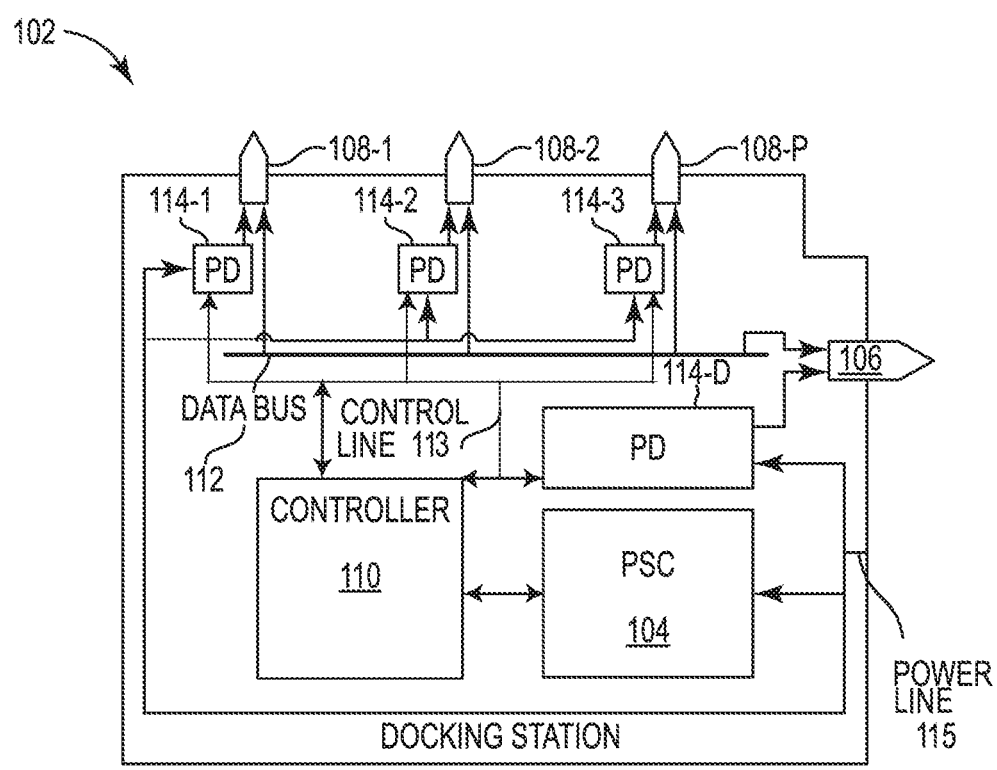
FIG. 1 illustrates a diagram of an example of a docking station according to the disclosure.

A docking station may provide a host device with multiple peripherals and ports when the host device is connected to the docking station. As used herein, a host device refers to mobile phone, tablet, laptop, and/or gaming device, among other types of electronic devices suitable with docking stations as described herein.

Moreover, the docking station may permit a host device to function as another device when coupled to the docking station. For instance, a tablet may be able to function as a notebook and/or a laptop computer may function as a desktop computer when connected to the docking station. Thus, a tablet may be compatible with a docking station that includes a keyboard. The keyboard enables the user to provide input for the tablet similar to that of a notebook or desktop computer.

Further, the docking station can include connectors and/or ports to communicate power and/or data with peripheral devices. As used herein, peripheral devices refer to displays (e.g., monitors, televisions, etc.), speakers, cameras, user input devices such as a keyboard and/or a mouse, printers, scanners, mobile devices, payment instruments, tablets, desktop computers, laptop computers, augmented reality and/or virtual reality headsets, and/or gaming devices, among other types of electronic devices suitable with docking stations. For instance, the docking station can include a dedicated port to provide power and/or data to a host device and another dedicated port to provide power and/or data to a peripheral device. That is, docking stations can permit a host device and/or peripheral devices coupled to the docking station to receive power from the docking station.

Notably, a power supply of a host device can be employed to as a power supply for a docking station and/or the docking station can have its own dedicated power supply. In any case, the docking station can supply power to a host device and/or a peripheral device. However, power demands of the host device and/or the peripheral device may vary. For instance, power demands may vary based on a number/type of peripheral devices coupled to the docking station changing and/or based on different use of a host device and/or a peripheral device. Consequently, it may be desirable for a docking station to allocate and transmit varying amounts of power to a host device and peripheral devices based on varying power demands of the host device and/or varying power demands of the peripheral device.

Accordingly, the disclosure is directed to docking stations. For example, a docking station can include a power sensing component (PSC) to determine an amount of supplied power received from a power supply coupled to the docking station, a host power port to power a host device (HD), a peripheral power port (PPP) to power a peripheral device, and a controller to cause transmission of an amount of host power to the HD and an amount of dock power to the PPP, where the amount of host power and the amount of dock power are equal to respective portions of the amount of supplied power, receive a signal indicative of a change in power demands of the HD or power demands of the PPP, redetermine an amount of host power in response to on the detected change, redetermine an amount of dock power in response to the detected change, and cause transmission of the redetermined host power to the HD and the redetermined dock power to the PPP. Desirably, docking stations as described herein can promote use of comparatively smaller (smaller footprint and/or less power), less complex, and cost effective power supplies than dockings stations which have fixed (non-varying) outputs of power and therefore employ larger power supplies in to accommodate possible use cases where a host device coupled to the docking station draws its entire possible operating power.

FIG. 1 illustrates a diagram of an example of a docking station 102 according to the disclosure. As illustrated in FIG. 1, the docking station 102 can include a PSC 104, a host power port 106, a peripheral device port 108 illustrated as a first peripheral device port 108-1, a second peripheral device port 108-2, and a third peripheral device port 108-P, a controller 110, a data bus 112, control line 113, power line 115, and power distributors illustrated as a first power distributor 114-1, a second power distributor 114-2, a third power distributor 114-3, and a fourth power distributor 114-D.

The docking station 102 refers to a device that can power and/or provide a host device with multiple peripherals and ports when the host device is connected to the docking station. That is, docking station 102 can removable connect to a host device.

The docking station 102 can include docking hardware (not illustrated) to removably connect the docking station and the host device. In some examples, the docking hardware can include hardware to permit data and/or power communication between the docking station 102 and the host device. For instance, the controller can provide an amount of host power to the host device via the docking hardware and/or via a peripheral power port include in or adjacent to the docking hardware. That is, in some examples, the controller is to provide the amount of host power via the peripheral power port to the host device when the host device is coupled via the docking hardware to the docking station, as described herein.

The docking station 102 and/or a host device can include a release (not illustrated) to separate a docked host device from the docking station 102. Release may be, for example, a button, a slide switch, or another type of release.

The PSC 104 refers to a component that can directly or indirectly determine an amount of supplied power (e.g., an amount of wattage, current and/or voltage) received from a power supply, as described herein, coupled to the docking station 102. For instance, in some examples the PSC 104 can include wattage meter, a voltage meter, a current meter, or a combination thereof to directly determine an amount of supplied power received from a power supply, as described herein, coupled to the docking station 102. However, the disclosure is not so limited.

Rather, the PSC 104 can indirectly determine an amount of supplied power received from a power supply based on information provided to the PSC 104 and/or otherwise to the docking station 102 from a power supply, as described herein. In any case, the PSC 104 can determine an amount of power supplied from a power supply. Notably, in the event of a change in an amount of power supplied from a power supply the PSC 104 can determine a first amount of supplied power received from a power supply coupled to the docking station and a second amount (different than the first amount) of supplied power received from a power supply (the same or a different power supply).

Docking station 102 may include a keyboard and/or touchpad (not illustrated). Keyboard may be a "QUERTY" keyboard or another type of keyboard, among other possible components. The docking station 104 may include other components or features such as a card reader for reading ID card or another type of card reader. The docking station 102 may include additional ports, storage, or another component usable by a host device when docked to the docking station 104. For example, docking station 102 may include a Universal Serial Bus (USB) port, an HDMI port, or another type of port.

For instance, the docking station 102 can include the host power port 106. The host power port 106 can be a universal serial bus (USB) port such as a type-C USB port among various other types of input/output (I/O) systems such as Ethernet, esata, IEEE 1394, thunderbolt, or another system.

The host power port 106 can couple to a corresponding power port in a host device to communicate power and/or data with the host device. For instance, at least a portion of a total designed operational power can be supplied via the host power port 106 to a host device. In this manner, a power supply of the host device can be indirectly coupled to the host device to permit supply of power to the host device and to a peripheral power port 108.

The peripheral device port 108 is illustrated as a first peripheral device port 108-1, a second peripheral device port 108-2, and a third peripheral device port 108-P. The peripheral device port 108 can be a USB port such as a type-C USB port among various other types of input/output (I/O) systems such as Ethernet, esata. IEEE 1394, thunderbolt, or another system.

The controller 110, as described herein, can include hardware components and/or computer-readable and executable instructions to perform aspects suitable with docking stations of the disclosure. The data bus 112 can refer to a peripheral component interconnect express (PCIe) bus or other type of bus to communicate data and/or power between various components of the docking station 102. For instance, the data bus 112 can communicate USB and/or Display data, among other types of data.

The control line 113 can couple the controller 110 to various components such as to the power distributors 114 to promote aspects of docking stations, as described herein. For instance, the controller can communicate via the control line to a given power distributor (e.g., power distributor 114-1) to provide docking power via a power line, as described herein, to a peripheral device. Similarly, the controller 110-1 can communicate with a power distributor (e.g., power distributor 114-D) to provide host power via a power line, as described herein, to a host device, as described herein. The power line 115 can promote providing power to the host device and/or a peripheral device, as described herein.

The power distributors illustrated as a first PD 114-1, a second PD 114-2, a third PD 114-3, and a fourth power PD 114-D. The power distributors 214 can refer to passive or active circuitry to regulate an amount of power provided to the peripheral power port 108. For instance, the first PD 114-1, a second PD 114-2, a third PD 114-3, and a fourth power PD 114-D, can regulate an amount of power provided to a first peripheral power port 108-1, a second peripheral power port 108-2, a third peripheral power port 108-3, and a host power port 106, respectively. For example, the power distributors and distribute an amount or dock power and/or an amount of reserved power to the peripheral power port 108. While the power distributors are illustrated in FIG. 1 as separate and distinct from the peripheral power port and the host power port it is understood that the power distributors can, in some examples, be integral with the peripheral power port and/or the host power port.

Figure 2:
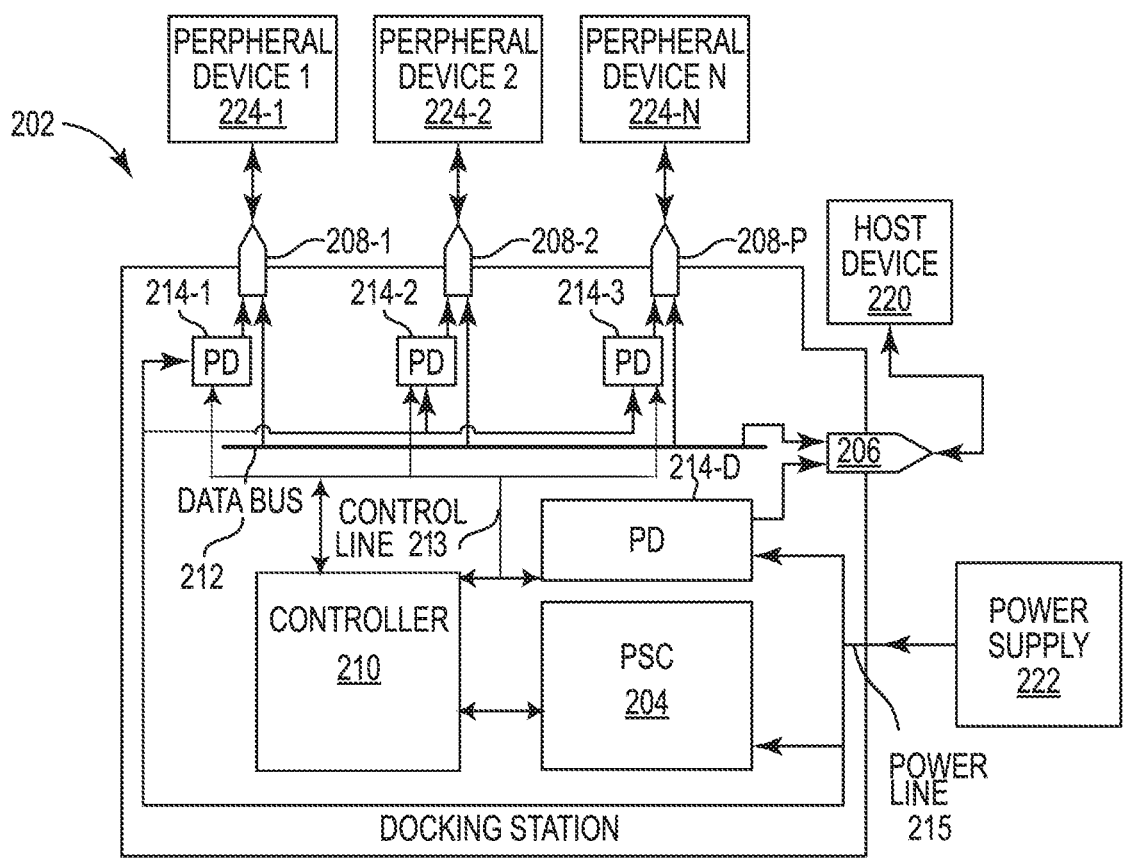
FIG. 2 illustrates another diagram of an example of a docking station according to the disclosure.

FIG. 2 illustrates another diagram of an example of a docking station 202 according to the disclosure. As illustrated in FIG. 2, the docking station 202 can include a PSC 204, a host power port 206, a peripheral device port 208 illustrated as a first peripheral device port 208-1, a second peripheral device port 208-2, and a third peripheral device port 208-P, a controller 210, a data bus 212, a control line 213, a power distributor 214 illustrated as a first power distributor 214-1, a second power distributor 214-2, a third power distributor 214-3, and a fourth power distributor 214-D, and a power line 215.

The first peripheral port 208-1, the second peripheral port 208-2, the third peripheral port 208-3, and the host power port 206 can provide the respective amounts of regulated power to the first peripheral device 224-1, the second peripheral device 224-2, the third peripheral device 224-N, and the host device 220. As illustrated in FIG. 2, the docking station 202 can be coupled to a peripheral device 224 illustrated as a first peripheral device 224-1, a second peripheral device 224-1, and a third peripheral device 224-1.

The docking station 202 can be coupled in a wired or wireless manner to the peripheral device 224. For instance, a USB connector in the docking station 202 can be coupled via a cord to a corresponding USB connecter in the peripheral device to permit data and/or power communication between the docking station 202 and the peripheral device 224, among other possibilities.

As mentioned, the docking station 202 can include docking hardware (not illustrated) to removably connect the docking station and the host device 220. In some examples, the docking hardware can include hardware to permit data and/or power communication between the clocking station 202 and the host device 220. As mentioned, the data bus 212 can communicate various types of data such as USB data among components of the docking station, with the peripheral device 208 and/or with the host device 220.

The power supply 222 refers to a device to provide power to the docking station. For example, the power supply 222 can be a direct current (DC)/DC power supply or an alternating current (AC)/DC power supply. As mentioned, in some examples the power supply 222 can provide information to the PSC 204. For example, the power supply includes circuitry for producing an analog data signal for use by the docking station 222 to control or otherwise influence an amount of power drawn by the docking station 222 and/or by the peripheral devices 224. A cable has an output connector with a plurality of conductors to transfer the DC power and the analog data signal to the PSC 204 of the docking station 202. The connector further includes circuitry to receive a data request from the docking station 202 and in response transmit a data output which identifies the power supply equipment and therefore an amount of supplied power to the docking station 202.

While FIG. 2 illustrates a three peripheral devices 224, three peripheral power ports 208, four power distributors 214-D, one host device 220, one host power port 206, and one power supply 222 it is understood that a total number of the peripheral devices 224, the peripheral power ports 208, the power distributors 214-D, the host device 220, the host power port 206, the power supply 222 and/or a total number of other components included in the docking station 202 can be increased or decreased depending upon a desired application of the docking station 202 or otherwise. For instance, in some examples two power supplies can be coupled to the docking station 202 at the same time to provide an amount of supplied power equal to a sum of a supplied power of a first power supply and a supplied power of a second power supply. Regardless of a total number of power supplies, the power line 215 can provide an amount of supplied power to the host device 220 and/or to the peripheral device 224.

As mentioned, the control line 213 can couple the controller 210 to various components such as to the power distributor 214 to promote aspects of docking stations, as described herein. For instance, the controller can communicate via the control line to a power distributor (e.g., power distributor 214-1) to provide docking power via the power line 215 to a peripheral device (e.g., peripheral device 224-1). Similarly, the controller 110-1 can communicate with a power distributor (e.g., power distributor 214-D) to provide host power via the power line 215 to a host device such as host device 220.

Figure 3:
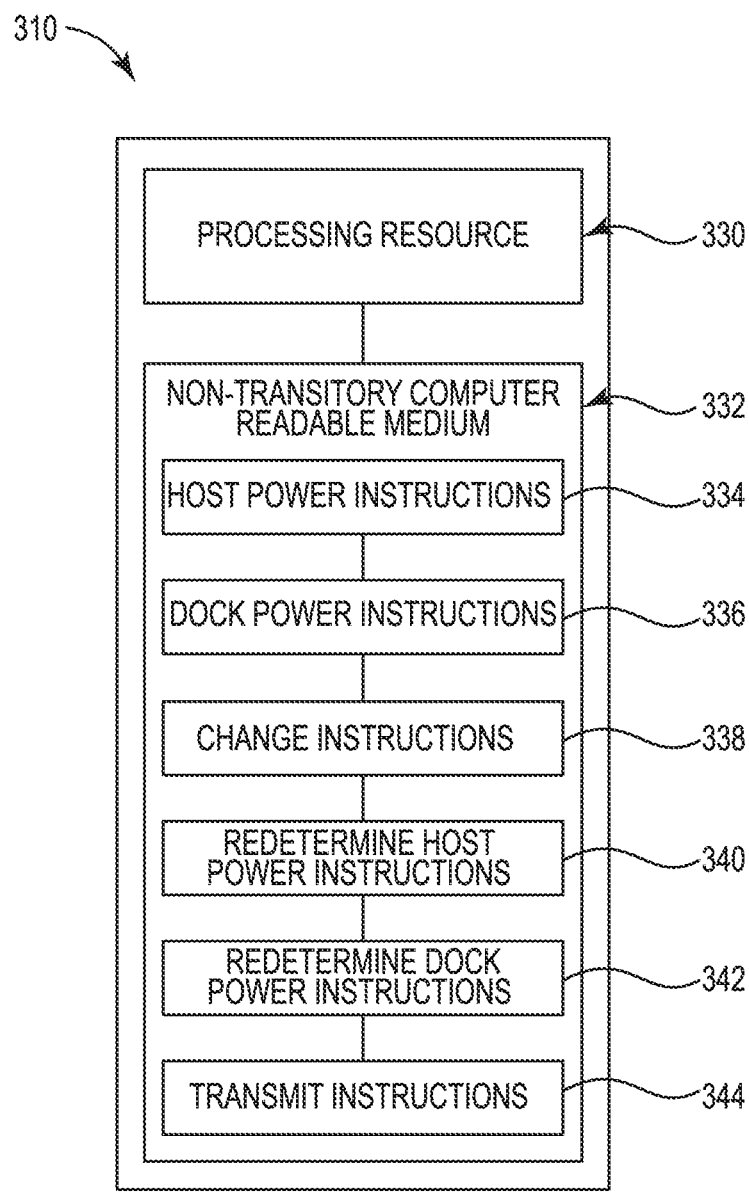
FIG. 3 illustrates another diagram of an example of a docking station controller according to the disclosure.

FIG. 3 illustrates another diagram of an example of a docking station controller 310 according to the disclosure. As illustrated in FIG. 3, the controller 310 can include a processing resource 330 and a non-transitory computer readable medium 332. Processing resource 330 can refer can refer to a hardware processing resource, among other possibilities.

The non-transitory machine readable medium 332 may be any type of volatile or non-volatile memory or storage, such as random access memory (RAM), flash memory, read-only memory (ROM), storage volumes, a hard disk, or a combination thereof. In some examples, at 334, the medium 332 can include host power instructions to determine an amount of host power for a host device based on power demands of the host device and an amount of the supplied power.

For example, an amount of host power can be equal to an amount of supplied power less a power demands of the host device. Power demands of a host device can be equal to a designed amount of operational power of a host device, equal to amount of power specified by a user of a host device, equal to an amount of power consumed by a host device at a given point in time, and/or an average amount of power consumed by a host device over a period of time, among other possibilities. However, it is noted, that in some examples, an amount of supplied power can be reduced by an amount of reserved power and/or an amount of dock power prior to determining an amount of host power.

For instance, in some examples, an amount of host power can be reduced by an amount of reserve power. For example, an amount of reserve power can be from 3 watts to 30 watts, among other possible values and/or units of measure of power. When an amount of reserve power is equal to 30 watts an amount of supplied power can be reduced by 30 watts. As an example, if a power supply provides 90 watts of power then the 90 watts can be reduced by the 30 watts of the reserve power prior to the host power being determined. In this manner, an amount of host power for the host device can be determined while ensuring a given amount of power is reserved for possible transmission as dock power to the peripheral power port. It is noted that respective amounts of dock power, reserve power, and/or host power can be determined dynamically and adjusted due to a change in an amount of power supplied to the docking station, a change in power demands of the peripheral device and/or a change in power demands of the host device.

In some examples, at 336, the medium 332 can include dock power instructions to determine an amount of dock power for peripheral power port based on power demands of the peripheral power port and the first amount of the supplied power. For example, the amount of dock power can be equal to an amount of supplied power less the amount of host power. For instance, a power supply can supply 90 watts of supplied power to a docking station. In such examples, the host power may be equal to 60 watts while the dock power may be equal to 30 watts, among other possibilities.

However, the disclosure is not so limited. Rather, the power demands of the peripheral power port can be equal to an amount of reserve power, as described herein. Alternatively or in addition, the power demands of the peripheral power port can be equal to an amount of power consumed by the peripheral power port such as collective amount of power consumed by each peripheral power port of the peripheral power ports. Thus, a change in power demands of the peripheral power port can be attributable to a change in an amount of reserve power and/or a change in power consumption of a peripheral device coupled to the peripheral power port, among other possibilities.

In some examples, as illustrated at 338, the medium 332 can include change instruction to receive a signal indicative of a change in power demands of the HD or power demands of the PPP. For instance, a host power port, a peripheral power port, a host device, and/or a peripheral device can send a signal to the controller indicative of a change in power demands of the host device and/or the peripheral power ports. Regardless of the point of origin, in this manner, a signal indicative of a change to the power demands of the HD or the PPP can be provided to and received by the controller.

However, the disclosure is not so limited. For instance, the change instructions can receive a signal from the PSC indicative of a change in the first amount of the supplied power to a second amount of supplied power (different than the first amount of supplied power). As mentioned, the PSC can directly or indirectly detect an amount of supplied power.

In some examples, as illustrated at 340, the medium 332 can include redetermine host power instructions to redetermine an amount of host power in response to on the detected change. The redetermine host power instructions 340 can redetermine the host power based on a change to power demands of the HD and/or a change to power demands of the PPP in a similar manner as the host power instructions 334 determined the host power.

Similarly, in some examples, as illustrated at 342, the medium 332 can include redetermine host power instructions to redetermine an amount of dock power in response to the detected change. The redetermine dock power instructions 342 can redetermine the host power based on a change to power demands of the HD and/or a change to power demands of the PPP in a similar manner as the dock power instructions 336 determined the dock power.

In some examples, as illustrated at 344, the medium 332 can include transmit instructions to cause transmission of power to the host device and/or the peripheral power port. For example, the transmit instruction can include instructions to cause transmission of an amount of host power for the host device and an amount of dock power for peripheral power port and/or to cause transmission of the redetermined host power to the host device and the redetermined dock power to the peripheral power port. As used herein, causing refers to directly causing an action (transmission of power) or performing an action such as sending instructions to another component to cause transmission of the power.

Figure 4:
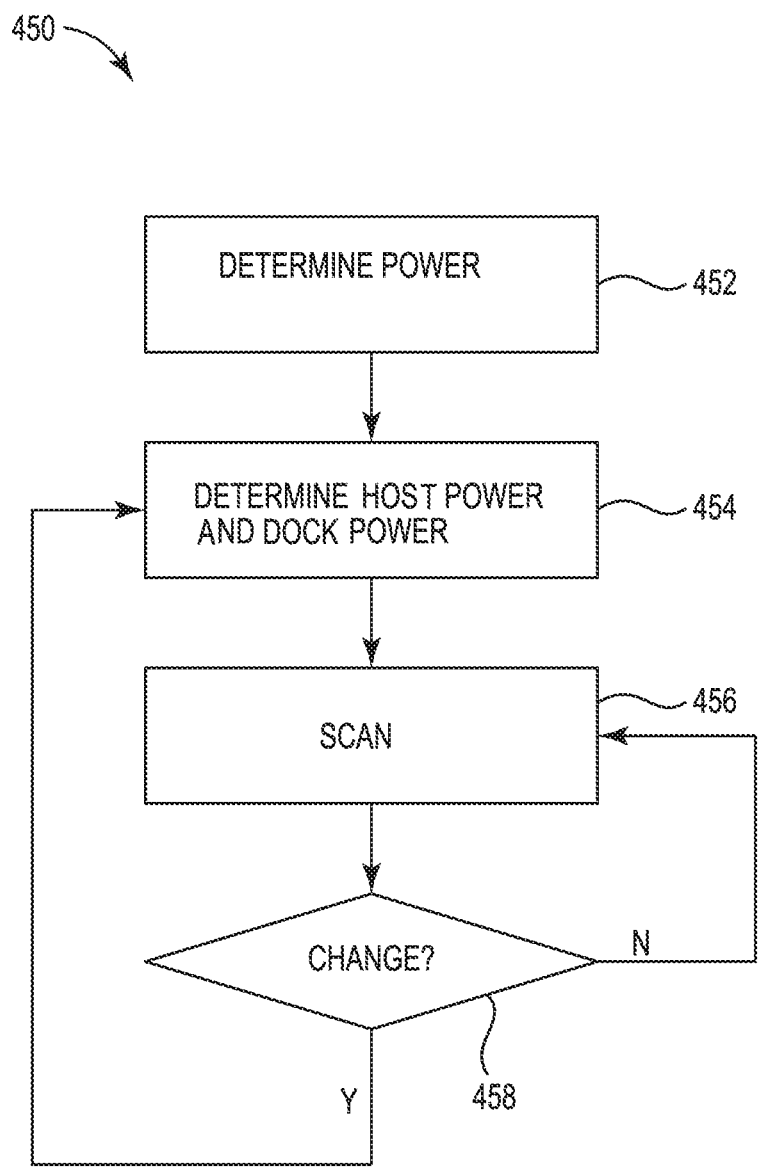
FIG. 4 illustrates a flow diagram of an example of a method suitable with dockings stations according to the disclosure.

FIG. 4 illustrates a flow diagram of an example of a method 450 suitable with dockings stations according to the disclosure. As illustrated at 452, the method 450 can determine an amount of supplied power of a power supply such as an AC/DC or DC/DC power supply. As mentioned, the PSC can directly or indirectly determine an amount of supplied power. As illustrated at 454, the method 450 can determine an amount of host power to allocate to the host device and determine an amount of dock power to allocate to the peripheral power port, as described herein.

As illustrated at 456, the method 450 can include scanning an amount of power supplied by a power supply, power demands of a host device, and/or power demands of the peripheral power port. For example, the controller periodically or in response to an input perform a scan or otherwise cause another device to provide power demands of a host device and power demands of a peripheral device and the method 450 can proceed to 458.

Similarly, in some examples, the PSC can periodically or in response to an input perform a scan to redetermine an amount of supplied power received from a power supply coupled to the docking station and the method can proceed to 458. A first amount of supplied power may change when a power supply is connected and/or disconnected, among other possibilities such as an additional power supply being connected to the docking station and provided an increased amount of supplied power relative to the first supplied power of a given power supply The method 450 can include determining a change, for example, of an amount of power demands of the host device, and/or power demands of the peripheral power port, among other possibilities such as a change in an amount of supplied power.

For example, can compare current power demands of the host device and the peripheral power device obtained at 456 to previous power demands of the host device and the peripheral power device. The previous values can be stored in the controller or at another location. If the controller determines a change in a value of the power demands method can proceed to 454 whereas no change in the value of the power demands the method can proceed to 456 and continue accordingly. It is noted, that in various examples, the controller can detect a change from non-zero power demand (e.g., 30 watts) to another non-zero power demand (e.g., 20 watts).

Similarly, in some examples, the PSC perform a scan as indicated at 456 to determine a second amount of supplied power received from a power supply coupled to the docking station in response to receipt of a signal at the PSC or otherwise at the docking station that indicates change or possible change in the first amount of supplied power.

Figure 5:
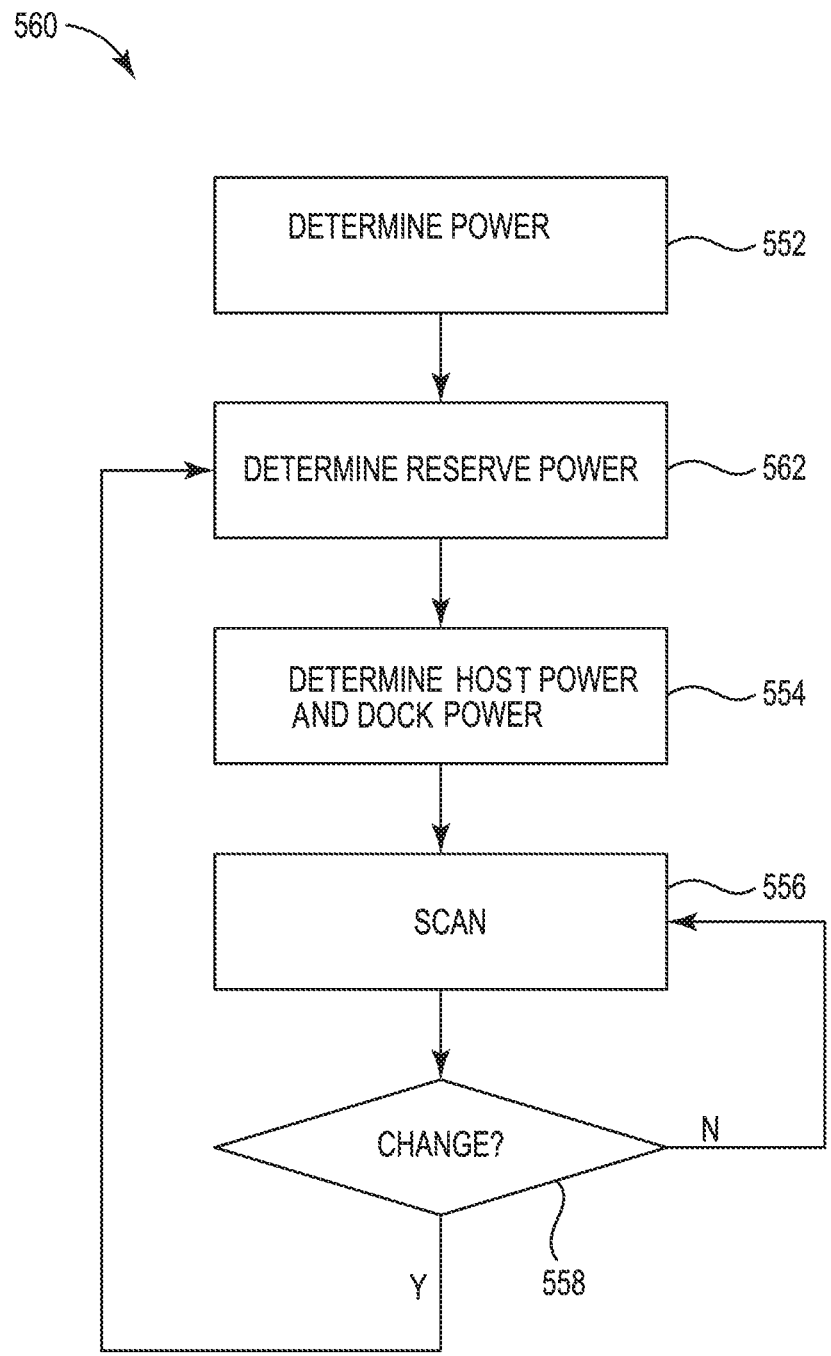
FIG. 5 illustrates a flow diagram of another example of a method suitable with dockings stations according to the disclosure.

FIG. 5 illustrates a flow diagram of another example of a method 560 suitable with dockings stations according to the disclosure. As illustrated at 552, the method 560 can include determining an amount of supplied power of a power supply such as an AC/DC or DC/DC power supply.

As illustrated at 562, the method 560 can include determining an amount of reserve power, as described herein. As illustrated at 554, the method 5600 can include determining an amount of host power to allocate to the host device and determining an amount of dock power to allocate to the peripheral power port, as described herein. As mentioned, an amount of potential host power can be reduced by an amount of reserve power. For example, an amount of reserve power can be from 3 watts to 30 watts, among other possible values and/or units of measure of power.

As illustrated at 556, the method 560 can include scanning an amount power demands of a host device, and/or power demands of the peripheral power port among other possibilities such as a change in an amount of supplied power, as described herein. The method 560 can include determining a change, for example, of power demands of the host device and/or power demands of the peripheral power port, as described herein. For instance, if the controller determines a change in a value of the power demands the method can proceed to 554 whereas no change in the value of the power demands the method can proceed to 556 and continue accordingly.

Figure 6:
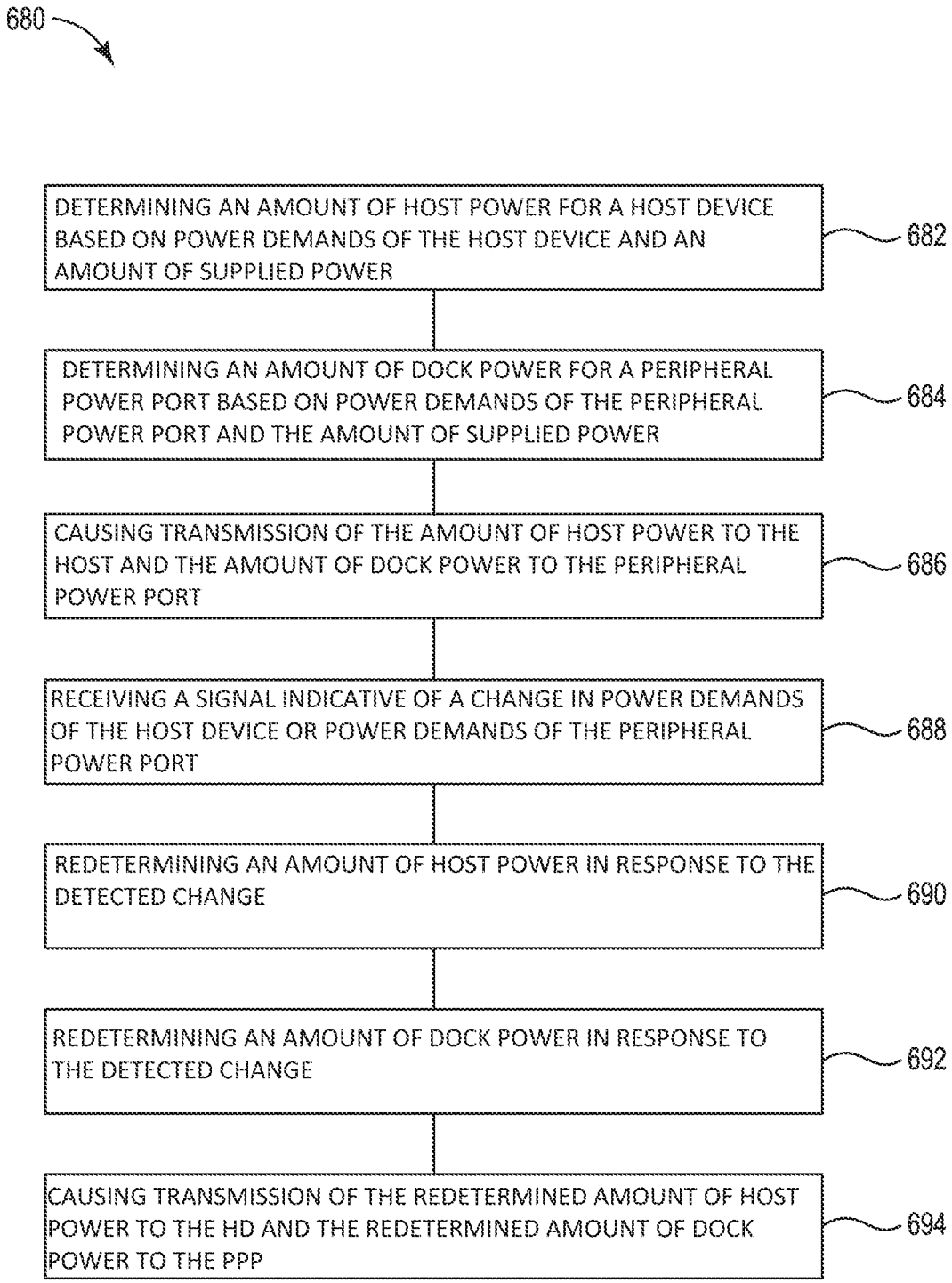
FIG. 6 illustrates a diagram of an example of a method suitable with dockings stations according to the disclosure.

FIG. 6 illustrates a diagram of an example of a method 680 suitable with dockings stations according to the disclosure. As illustrated at 682, the method 680 can include determining an amount of host power for a host device based on power demands of the host device and an amount of supplied power, as described. herein. As illustrated at 684, the method 680 can include determining an amount of dock power for a peripheral power port based on power demands of the peripheral power port and the amount of the supplied power, as described herein. The method 680 can include causing transmission of an amount of host power for a host device and an amount of dock power for a peripheral power port, as illustrated at 686 and described herein.

As illustrated at 688, the method 680 can include receiving a signal indicative of a change in power demands of the host device or power demands of the peripheral power port. For instance, a host power port, a peripheral power port, a host device, and/or a peripheral device can send a signal to the controller indicative of a change in power demands of the host device and/or the peripheral power port. For example, the host power port and the peripheral power port can include power distributors such as those described herein to detect and based on the same transmit a change in an amount of power demands of the host device and/or the peripheral power port. For instance, the host power port and the peripheral power port can each be a type-C USB port including power distributor.

As illustrated at 690, the method can include redetermining an amount of host power in response to the detected change. The redetermined host power can be equal to or different than the host power. For instance, when the power demands of the host device remain the same (e.g., but the power demands of the PPP have changed) the redetermined host power can be equal to the host power. However, when the power demands of the host device change or when another input (e.g., from a user to change an amount of reserve power, etc.) is received then the amount of redetermined host power is different than the host power. In this manner, changes in power demands (of the host device and/or the peripheral power port) can be accounted for as can other changes such as a change in a specified amount of reserve power and/or a change in an amount of supplied power.

Similarly, as illustrated at 692, the method 680 can include redetermining an amount of dock power in response to the detected change. The redetermined dock power can be equal to or different than the dock power. For instance, when the power demands of the peripheral power port remain the same (e.g., but the power demands of the host device have changed) the redetermined dock power can be equal to the dock power.

However, when the power demands of the peripheral power port changes or when another input (e.g., from a user to change an amount of reserve power, etc.) is received then the redetermined amount of dock power is different than the dock power. For instance, the redetermined amount of dock power can be increased to account for increased consumption of dock power by a peripheral device coupled to the peripheral device port and/or increased, among other possibilities. Accordingly, changes in power demands (of the host device and/or the peripheral power port) can be accounted for as can other changes such as a change in a specified amount of reserve power and/or a change in an amount of supplied power.

As illustrated at 694, the method 680 can include causing transmission of the redetermined amount of host power to the HD and the redetermined amount of dock power to the PPP, as described herein. That is, the redetermined amount of host power and the redetermined amount of dock power can be transmitted via a power line coupled to the host device and a power line coupled to the peripheral power ports.

In some examples, the method 680 can include receiving a signal indicative of a change in the power demands of the PPP and redetermining the amount of dock power and the amount of host power in response to receipt of the signal and/or receiving a signal indicative of a change in the power demands of the HD and redetermining an amount of dock power and an amount of host power in response to receipt of the signal.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 110 may refer to element 110 in FIG. 1 and an analogous element may be identified by reference numeral 310 in FIG. 3. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A docking station comprising:
    a power sensing component (PSC) to determine an amount of supplied power received from a power supply coupled to the docking station;
    a host power port to power a host device (HD);
    a peripheral power port (PPP) to power a peripheral device;
    docking hardware to removably couple the HD to the PPP; and
    a docking station controller to:
        determine an amount of reserve power for the PPP prior to determining an amount of host power to power the HD;
        cause transmission of the amount of host power, via the docking hardware, to the HD and the amount of dock power to the PPP, wherein the amount of host power and the amount of dock power are equal to respective portions of the amount of supplied power, wherein the amount of host power is reduced by an amount of reserve power for the PPP;
        receive a signal indicative of a change in power demands of the HD or power demands of the PPP;
        redetermine an amount of host power in response to on the detected change;
        redetermine an amount of dock power in response to the detected change; and
        cause transmission of the redetermined host power, via the docking hardware, to the HD and the redetermined dock power to the PPP.

2. The docking station of claim 1, wherein the power supply further comprises an alternative current (AC)/direct current (DC) power adapter, and wherein the power sensing component is to determine the amount of the supplied power based on information provided from the AC/DC power supply.

3. The docking station of claim 1, wherein the PSC further comprises a wattage meter, a voltage meter, a current meter, or a combination thereof.

4. The docking station of claim 1, wherein the PPP further comprises a universal serial bus (USB) port, and wherein the host power port further comprises a USB port.

5. The docking station of claim 1, wherein the PPP is included in a plurality of PPPs including at least two different types of PPPs.

6. The docking station of claim 1, wherein the sum of the amount of host power and the amount dock power are equal to the amount of supplied power.

7. A docking station controller including a non-transitory computer readable medium having instructions executable by a processing resource to:
    determine an amount of reserve power in a range from 3 watts to 30 watts to power a peripheral power port (PPP) prior to determining an amount of host power to power a host device (HD);
    determine the amount of host power for the HD based on power demands of the HD, the amount of reserve power, and an amount of the supplied power;
    determine an amount of dock power for the PPP based on power demands of the PPP and the amount of the supplied power;
    receive a signal indicative of a change in power demands of the HD or power demands of the PPP;

redetermine an amount of host power in response to on the detected change;
redetermine an amount of dock power in response to the detected change; and
cause transmission of the redetermined host power, via docking hardware, to the HD and the redetermined dock power to the PPP.

8. The docking station controller of claim 7, wherein the instructions further comprise instructions to cause transmission of the amount of host power to the HD and the amount of dock power to the PPP.

9. The docking station controller of claim 7, wherein the amount of reserve power is from 3 watts to 30 watts.

10. The docking station controller of claim 7, wherein the amount of host power is reduced by the determined amount of reserve power for the PPP.

11. A method, comprising:
determining an amount of reserve power in a range from 3 watts to 30 watts to power a peripheral power port prior to determining an amount of host power to power a host device (HD);
determining the amount of host power for the HD based on power demands of the HD, the amount of reserve power, and an amount of supplied power;
determining an amount of dock power for the PPP based on power demands of the PPP and the amount of the supplied power;
causing transmission of an amount of host power, via docking hardware, to the HD and the amount of dock power to the PPP;
receiving a signal indicative of a change in power demands of the HD or power demands of the PPP;
redetermining an amount of host power in response to the detected change;
redetermining an amount of dock power in response to the detected change; and
causing transmission of the redetermined amount of host power, via the docking hardware to the HD and the redetermined amount of dock power to the PPP.

12. The method of claim 11, further comprising receiving a signal indicative of a change in the power demands of the PPP and redetermining the amount of dock power and the amount of host power in response to receipt of the signal.

13. The method of claim 11, further comprising receiving a signal indicative of a change in the power demands of the HD and redetermining an amount of dock power and an amount of host power in response to receipt of the signal.

* * * * *